United States Patent [19]

Seaman

[11] 4,289,213

[45] Sep. 15, 1981

[54] ANGULAR OUTPUT TRANSFER CASE

[75] Inventor: Robert L. Seaman, Muncie, Ind.

[73] Assignee: Borg-Warner Corporation, Chicago, Ill.

[21] Appl. No.: 106,056

[22] Filed: Dec. 21, 1979

[51] Int. Cl.³ .............................................. B60K 17/34
[52] U.S. Cl. .................................. 180/233; 74/665 C; 74/665 H; 180/248
[58] Field of Search ............... 180/233, 245, 246, 247, 180/248, 249, 250; 74/665 C, 665 H, 416, 414

[56] References Cited

U.S. PATENT DOCUMENTS

| | | | |
|---|---|---|---|
| 2,185,636 | 1/1940 | Kysor | 180/249 |
| 2,859,634 | 11/1958 | Walter | 74/414 |
| 2,924,985 | 2/1960 | Crankshaw | 74/416 X |
| 4,147,225 | 4/1979 | Mazziotti et al. | 180/247 |

Primary Examiner—John A. Pekar
Attorney, Agent, or Firm—Julian Schachner

[57] ABSTRACT

An angular output transfer case incorporates an internal single cardan joint within the transfer case housing. The internal single cardan joint is coupled with an angularly oriented output shaft, and has a fixed included angle. An external single cardan joint without the housing couples the output shaft with a propeller shaft, and thus has a dynamic included angle. The joints are phased ninety degrees, and are related such that the fixed included angle is equal to the dynamic included angle at an optimum design condition.

17 Claims, 7 Drawing Figures

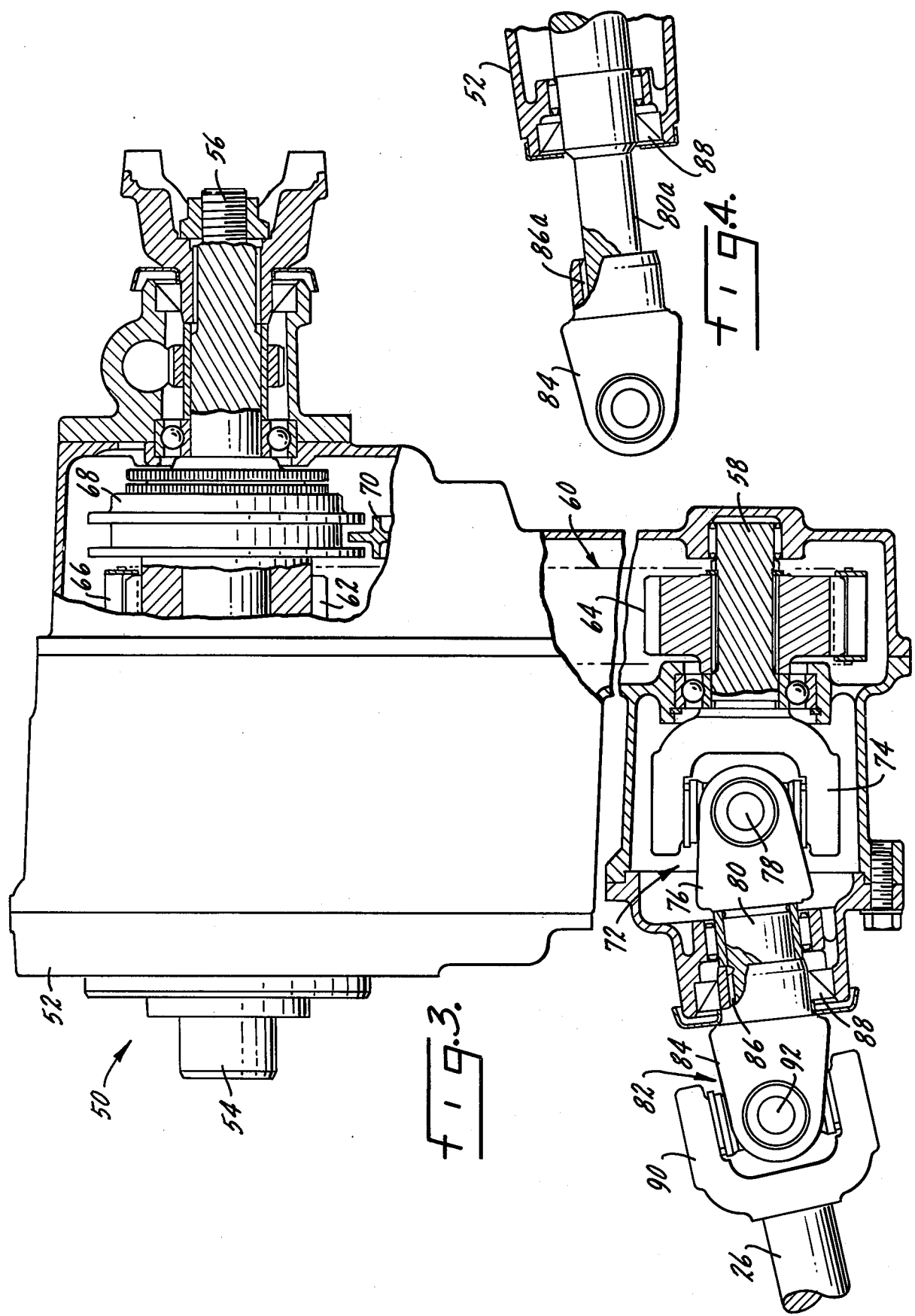

ANGULAR OUTPUT TRANSFER CASE

BACKGROUND OF THE INVENTION

This invention relates generally to torque transfer apparatus. More particularly, it relates to an angular output transfer case adapted for use in a four-wheel drive vehicle or the like. The transfer case permits the front or rear output shaft, or both, to be oriented at an angle relative to the input shaft.

In recent years there have been many improvements in automotive drive trains, including improvements relating to torque transfer cases adapted for use in four-wheel drive vehicles. As vehicles are downsized, at least one propeller shaft, usually the front shaft, becomes shorter. This results in an increased angle between the shortened propeller shaft and the transfer case output shaft to which it is coupled. The modern tendency has been to provide a double cardan joint (constant velocity universal joint) for coupling these shafts so as to compensate for the large included angle. This represents a costly addition to the transfer case.

Further, in the design of modern four-wheel drive vehicles, placement of at least one differential, usually the front differential, often is in a position offset from the vehicle centerline. Typically, this requires a lengthened transfer case to bring its output shaft into line with the differential input. This also represents a costly addition to the transfer case.

There remains a need in the art for a simple, inexpensive transfer case which will compensate for a large included angle between its output shaft and an associated propeller shaft, and which will negate the necessity for lengthening the transfer case itself.

SUMMARY OF THE INVENTION

A primary object of this invention is to meet the need noted above. To that end, there is provided a transfer case which includes internally within its housing a single cardan joint having a fixed included angle. The output shaft is angularly oriented, and is coupled to an associated propeller shaft externally by another single cardan joint. The two single cardan joints preferably are phased ninety degrees, and are oriented such that at an optimum design condition they have equal included angles. Together they perform like a double cardan joint to contain speed flux when the two included angles are equal.

Since the included angle of the internal single cardan joint is fixed, and that of the external single cardan joint is dynamic; i.e., it varies with ride height and jounce/rebound dynamics, a design compromise is required in determining the two included angles so as to minimize driveline vibration. This compromise is acceptable in many instances, and represents a substantial cost reduction as compared with the use of a double cardan joint by eliminating the centering mechanism of the double cardan joint.

In addition, angular orientation of the output shaft allows the designer to shorten the transfer case when it is coupled in driving relationship with an offset differential, while still containing speed flux within aceptable limits.

Further, service requirements during the operating life of the transfer case are reduced, as one of the single cardan joints is protected within the housing.

BRIEF DESCRIPTION OF THE DRAWINGS

The objects and advantages of this invention will become apparent to those skilled in the art upon careful consideration of the specification herein, including the drawings, wherein:

FIG. 2b is a diagram in plan showing the apparatus of FIG. 2a;

FIG. 3 is a cut-away view of the transfer case, partially in section, showing details of the invention; and FIG. 4 is a detail view showing a modification of the invention.

Figure 1A:
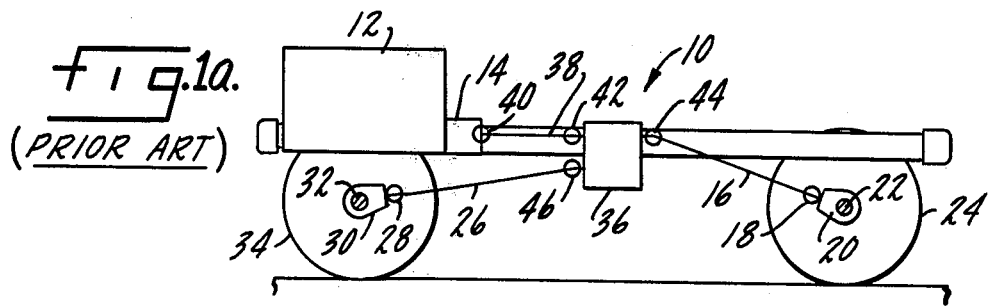
FIG. 1a is a diagram in elevation showing early prior art apparatus.

While this invention is susceptible of embodiment in many different forms, a preferred embodiment is shown in the drawings and will be described in detail. It should be understood that the present disclosure is considered to be an exemplification of the principles of the invention, and is not intended to limit the invention to this embodiment.

DETAILED DESCRIPTION OF THE PRIOR ART

Referring now to the drawings in greater detail, typical early prior art apparatus is shown in FIG. 1a. Such apparatus includes a four-wheel drive vehicle 10 having a prime mover 12 in driving relationship with a suitable transmission 14. A propeller shaft 16 is in driving engagement through a single cardan joint 18 with a differential 20. In turn, differential 20 drives a rear axle assembly 22 and a pair of ground-engaging wheels 24. Another propeller shaft 26 is in driving engagement through a single cardan joint 28 with a differential 30. In turn, differential 30 drives a front axle assembly 32 and a pair of ground-engaging wheels 34.

A torque transfer case 36 is in engagement with transmission 14 through a drive shaft 38 and single cardan joints 40,42 for receiving torque from prime mover 12. Transfer case 36 is in engagement through single cardan joints 44,46 respectively with propeller shafts 16,26 for transmitting torque to wheels 24,34.

Figure 1B:
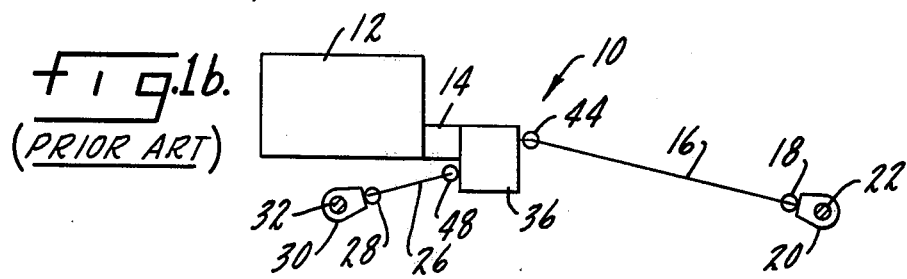
FIG. 1b is a diagram in elevation showing later prior art apparatus.
Figure 1C:
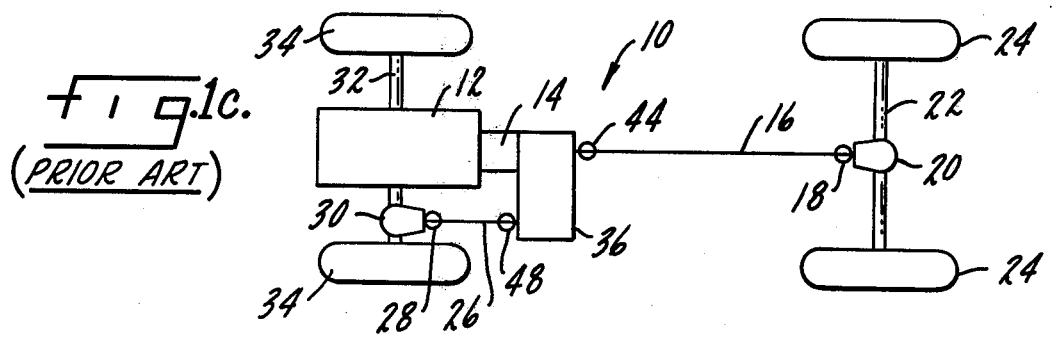
FIG. 1c is a diagram in plan showing the apparatus of FIG. 1b.
Figure 2A:
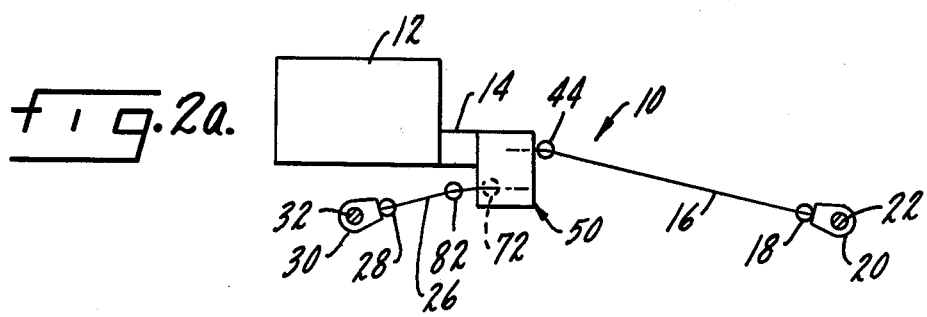
FIG. 2a is a diagram in elevation showing the apparatus of this invention.
Figure 2B:
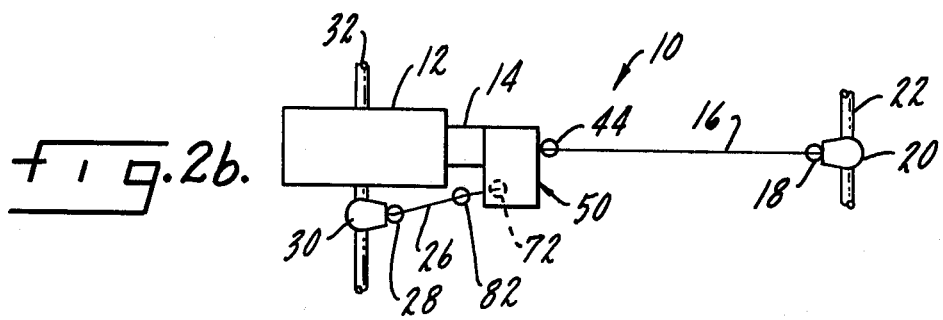

As shown in FIGS. 1b and 1c, it was determined later that drive shaft 38 and joints 40,42 could be eliminated if transfer case 36 were moved forwardly into direct engagement with transmission 14. The disadvantage of this arrangement was that as transfer case 36 was moved forwardly, the length of propeller shaft 26 correspondingly was reduced, and the angle between the front output shaft of transfer case 36 and propeller shaft 26 necessarily became larger. At some point, designers were forced to replace single cardan joint 46 with a double cardan joint 48.

To accommodate the offset position of differential 30, designers also were forced to lengthen transfer case 36 so as to bring its output shaft into line with the input of differential 30.

DETAILED DESCRIPTION OF THE PREFERRED EMBODIMENT

Referring now to FIGS. 2a, 2b, 3 and 4, the apparatus of this invention includes a transfer case 50 having a housing 52. An input shaft 54 extends into housing 52 and is journalled for rotation on an input axis. If desired, input shaft 54 may be the output shaft of transmission 14.

A first output shaft 56 is in engagement with input shaft 54. First output shaft 56 extends out of housing 52 and is journalled for rotation on a first output axis which, if desired, may be coaxial with the input axis. Shaft 56 may be coupled through single cardan joint 44 with propeller shaft 16.

An intermediate shaft 58 is journalled for rotation within housing 52 on an intermediate axis. A suitable drive train 60 may include, for example, a pulley 62 journalled relative to input shaft 54, a pulley 64 secured to shaft 58, and a chain 66 coupling pulleys 62,64.

In the preferred embodiment of the invention, transfer case 50 may include a suitable reduction unit for providing high-speed and low-speed ranges. Such a reduction unit may be in the form of a planetary gear assembly of the type disclosed in U.S. application Ser. No. 937,342 filed Aug. 28, 1978. A suitable synchronizing clutch 68 may be provided for shifting between four-wheel and two-wheel drive by selectively engaging and disengaging pulley 62 with input shaft 54. Shift apparatus including a shift fork 70 may be provided for shifting synchronizer 68 in conjunction with the shifting of the associated planetary gear assembly. Such shift apparatus is considered conventional, and need not be described in detail.

A first, internal single cardan joint 72 is contained within housing 52. Internal joint 72 includes a first input yoke 74 secured to shaft 58, and a first output yoke 76. Yokes 74,76 are coupled by a first cross 78.

A second output shaft 80 is secured to yoke 76, and extends out of housing 52. Shaft 80 is journalled for rotation on a second output axis oriented transversely relative to the intermediate axis by some predetermined fixed acute angle which determines the included angle of internal joint 72.

A second, external single cardan joint 82 includes a second input yoke 84 secured to shaft 80 by a spline connection 86 or the like for rotation therewith. A seal 88 is supported by housing 52, and is in sealing contact with yoke 84. If desired, spline connection 86 may be sufficiently loose such that yoke 84 is both rotatable with shaft 80 and slidable relative thereto along the second output axis.

External joint 82 also includes a second output yoke 90 coupled with yoke 84 by a second cross 92. Yoke 90 may be secured to propeller shaft 26.

A modified form of the preferred embodiment is shown in FIG. 4. Seal 88 is in sealing contact with a modified second output shaft 80a. Yoke 84 is secured to shaft 80a by a spline connection 86a or the like externally of housing 52. If desired, spline connection 86a may be sufficiently loose such that yoke 84 is both rotatable with shaft 80a and slidable relative thereto along the second output axis.

In either form of the preferred embodiment, propeller shaft 26 need not be telescopic, as is typical in modern vehicles, if input yoke 84 is loosely splined to second output shaft 80 or 80a.

Also in the preferred embodiment of the invention, single cardan joints 72,82 are phased ninety degrees, as shown in FIG. 3.

The included angle of single cardan joint 72 is fixed. The included angle of single cardan joint 82 is dynamic and varies with load and jounce/rebound. An advantage of this invention is that in the nominal design configuration, each of these two included angles is preferably equal to one-half of the included angle which necessarily would obtain in a double cardan joint. Thus, dynamic variation of the included angle of single cardan joint 82 is relatively small. Torsional disturbances correspondingly are relatively small. The result is that a compromise is obtained by the two single cardan joints, which act in concert to contain the speed flux in a high angle joint in approximately the same way as does a double cardan joint. Indeed, at the point where the two included angles are equal, single cardan joints 72,82 perform as a double cardan joint.

Another advantage of this invention is that transfer case 50 need not be lengthened significantly when differential 30 is offset. The angular relationship of shaft 80 or 80a with respect to shaft 58 allows the designer to provide a shorter transfer case 50 than would otherwise be acceptable.

Still another advantage of this invention is that single cardan joint 72 is protected from the elements by being located entirely within housing 52.

It should be obvious that a similar pair of single cardan joints may be provided at shaft 56 in lieu of or in addition to single cardan joints 72,82.

Indeed, as automotive vehicles are downsized, the problem of large angles between transfer case output shafts and their associated propeller shafts becomes more acute. In many instances, the problem may be solved simply and inexpensively in accordance with the practical compromise of the invention disclosed herein.

CLAIMS

It should be understood that while a preferred embodiment of the invention has been shown and described, this is to be considered as illustrative and may be modified by those skilled in the art. It is intended that the claims herein cover all such modifications as may fall within the spirit and scope of the invention.

What is claimed is:

1. Apparatus including a transfer case, said transfer case comprising a housing, an input shaft extending into said housing and supported for rotation on an input axis, a first output shaft extending out of said housing and supported for rotation on a first output axis, an intermediate shaft supported in said housing for rotation on an intermediate axis, means coupling said input shaft with said first output and intermediate shafts for transferring torque therebetween, a second output shaft extending out of said housing and supported for rotation on a second output axis, said intermediate and second output axes determining a fixed angle, a single cardan joint in said housing, said single cardan joint coupling said intermediate and second output shafts and having said fixed angle as its included angle, and yoke means rotatable with and slidable relative to said second output shaft.

2. The invention of claim 1, said transfer case further comprising a seal supported by said housing in sealing contact with said yoke means.

3. The invention of claim 1, said transfer case further comprising a seal supported by said housing in sealing contact with said second output shaft.

4. The invention of claim 1, said apparatus further including another single cardan joint incorporating said yoke means, said other single cardan joint having a dynamic included angle.

5. The invention of claim 4, said transfer case further comprising a seal supported by said housing in sealing contact with said yoke means.

6. The invention of claim 4, said transfer case further comprising a seal supported by said housing in sealing contact with said second output shaft.

7. The invention of claim 4, said apparatus further including a propeller shaft, said other single cardan joint coupling said second output and propeller shafts, the nominal design orientation of said propeller shaft being such that the included angle of said other single cardan joint is equal to the included angle of said single cardan joint.

8. The invention of claim 7, said apparatus further including a differential, and still another single cardan joint coupling said propeller shaft and differential.

9. The invention of claim 4, 5, 6, 7 or 8, said single cardan joint and said other single cardan joint being phased ninety degrees.

10. Apparatus comprising a housing, a first shaft supported within said housing for rotation on a first axis, a second shaft supported partially within and partially without said housing for rotation on a second axis, said first and second shafts being supported such that said first and second axes determine a fixed angle, an internal single cardan joint within said housing coupling said first and second shafts, said internal single cardan joint having said fixed angle as its included angle, a third shaft supported without said housing for rotation on a third axis, said second and third shafts being supported such that said second and third axes determine a dynamic angle, and an external single cardan joint without said housing coupling said second and third shafts, said external single cardan joint having said dynamic angle as its included angle, said apparatus being constructed and arranged such that said included angles are equal at an optimum design condition.

11. The invention of claim 10, said internal and external single cardan joints being phased ninety degrees.

12. The invention of claim 10, said external single cardan joint including a yoke rotatable with said second shaft.

13. The invention of claim 11, said external single cardan joint including a yoke rotatable with said second shaft.

14. The invention of claim 12, said yoke being rotatable with and movable relative to said second shaft.

15. The invention of claim 13, said yoke being rotatable with and movable relative to said second shaft.

16. The invention of claim 12, 13, 14 or 15, said apparatus further comprising a seal supported by said housing in sealing contact with said yoke.

17. The invention of claim 10, 11, 12, 13, 14 or 15, said apparatus further comprising a seal supported by said housing in sealing contact with said second shaft.

* * * * *